United States Patent
Winn

[15] 3,681,368
[45] Aug. 1, 1972

[54] PYRAZOLO NAPHTHRIDINES
[72] Inventor: Martin Winn, Deerfield, Ill.
[73] Assignee: Abbott Laboratories, North Chicago, Ill.
[22] Filed: Oct. 15, 1970
[21] Appl. No.: 81,121

[52] U.S. Cl. ................................260/295 T, 424/263
[51] Int. Cl. ..............................................C07d 39/10
[58] Field of Search ...................................260/295 T

[56] References Cited

UNITED STATES PATENTS 3,565,898   2/1971   Aldrich..........................260/295

*Primary Examiner*—Henry R. Jiles
*Assistant Examiner*—Robert T. Bond

*Attorney*—Robert L. Niblack

[57] ABSTRACT

Covers pyrazolo naphthyridines having the formula:

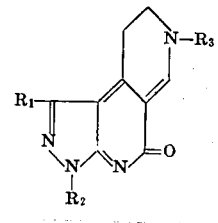

wherein $R_1$ is hydrogen or lower alkyl, $R_2$ is hydrogen, lower alkyl, phenyl or cyclohexyl and $R_3$ is phenyl, benzyl or halo benzyl. Compounds exhibit anti-inflammatory and other properties.

7 Claims, No Drawings

PYRAZOLO NAPHTHRIDINES

The present invention is directed to compounds of the formula

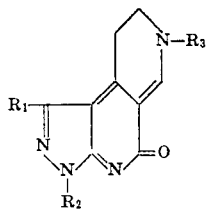

wherein $R_1$ is hydrogen or lower alkyl, such as methyl, ethyl, n-propyl, n-butyl, t-butyl, iso-propyl, etc.; $R_2$ is hydrogen, lower alkyl, phenyl or cyclohexyl, and $R_3$ is phenyl, benzyl or halo benzyl. When $R_1$ is lower alkyl, it normally is a compound of one to six carbon atoms. These compounds have anti-inflammatory properties and also exhibit central nervous system activity.

The novel compounds here can be made through a variety of techniques. One excellent reaction scheme involves reacting a carbethoxy piperidone with an amino pyrazole. The piperidone may also be N-substituted with a benzyl, phenyl or halobenzyl group. In like manner, the amino pyrazole may be N-substituted and/or ring-substituted. Thus, the amino pyrazole may be ring-substituted with a lower alkyl group and/or N-substituted with a lower alkyl, phenyl or cyclohexyl substituent. An acid salt of a carbethoxy piperidine such as the hydrochloric acid salt may also be used as a reactant.

Normally, the above reaction is carried out in the presence of a weak acid such as acetic acid over a period of time ranging from about five to about 25 hours. Extraction of the impure product with a solvent such as chloroform, followed by crystallization gives one the desired product.

The new compounds here exhibit anti-inflammatory activity when administered to warm-blooded animals such as humans at oral dosages of 10–200 mg./kg. More often, the dosage is 25–100 mg./kg. In addition, the new compounds made here are active as central nervous system depressants over the same dosage range.

A number of the compounds falling within the scope of the invention are set out below. It is understood, of course, that these examples are merely illustrative and that the invention is not to be limited thereto.

EXAMPLE I

Preparation of 1-methyl-6-benzyl-4,5,6,8-tetrahydro-1H-pyrazolo (3,4-b)[2,7]naphthyridin-8-one 29 grams of N-benzyl, 3-carbethoxy, 4-piperidone hydrochloride salt, 10 grams of 1-methyl-5-amino pyrazole and 40 ml. of acetic acid were stirred and refluxed for 15 hours. Thereafter 10 ml. of acetic acid was removed from the reaction mass by distillation at atmospheric pressure and the remainder of the acetic acid removed in vacuum. The residue was added to water and neutralized with sodium hydroxide and sodium carbonate to a pH of eight to nine.

The reactant mixture was extracted with chloroform, the chloroform layer dried over sodium carbonate and concentrated to give a residue. The residue was then crystallized from a chloroform-ethanol-ether mixture to give 11.5 grams of crystals having an m.p. of 148°–15

EXAMPLES II - IX

In these runs the technique of Example I was followed with the exception that the N-substitution of the amino pyrazole was varied as to its $R_2$ radicals and/or the amino pyrazole in some instances contained ring substitution ($R_1$ radicals). Likewise, the carbethoxy piperidone was varied as to its N-substitution ($R_3$ radicals). The following compounds were prepared:

TABLE I

| Compound No. | m.p. ° C. | $R_1$, $R_2$ and $R_3$ |
|---|---|---|
| 2 | 139 – 141 | $CH_3$, $CH_3$, $C_6H_5CH_2$ |
| 3 | 134 – 136 | H, $C_6H_5$, $C_6H_5CH_2$ |
| 4 | 144 – 146 | H, $C_6H_{11}$, $C_6H_5CH_2$ |
| 5 | 146 – 148 | $CH_3$, $C_6H_5$, $C_6H_5CH_2$ |
| 6 | 105 – 107 | $CH_3$, $CH_2CH_2CH(CH_3)_2$, $C_6H_5CH_2$ |
| 7 | 167 – 169 | $CH_3$, $C_6H_{11}$, $C_6H_5CH_2$ |
| 8 | 156 – 158 | $CH_3$, $CH_3$, $Cl-C_6H_4-CH_2$ |
| 9 | 112 – 114 | $CH_3$, $CH_3$, $C_6H_5CH_2CH_2$ |

EXAMPLE X

The anti-edema effect of representative members of the above group of compounds was established by the following procedure. An edema is produced in the paws of rats by the injection of carrageenan according to the process described by Winter et al., Proc. Soc. Exp. Biol. Med., 1962, vol. 111, p. 544. The test compounds were administered orally at various dosages (6 rats per dosage) thirty minutes prior to the administration of the edema-producing carrageenan. Edema is expressed as percent increase over normal paw size; inhibition is calculated from the difference between the average edema size of the control group and the average edema size of the test group. The following results were obtained as outlined in Table II.

TABLE II

| Compound No. | Anti-Inflammatory Activity |
|---|---|
| 1 | 22% inhibition at 100 mg./kg. |
| 2 | 39% inhibition at 30 mg./kg. |
| 3 | 14% inhibition at 100 mg./kg. |
| 4 | 16% inhibition at 100 mg./kg. |

What is claimed is:

1. A compound of the formula

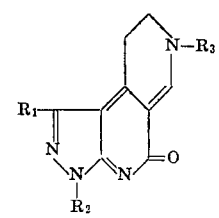

wherein $R_1$ is hydrogen or lower alkyl, $R_2$ is a radical selected from the group consisting of hydrogen, lower alkyl, phenyl and cyclohexyl, and $R_3$ is a radical selected from the group consisting of phenyl, benzyl and halobenzyl.

2. The compound of claim 1 wherein $R_1$ and $R_2$ are methyl and $R_3$ is benzyl.

3. The compound of claim 1 wherein $R_1$ is hydrogen, $R_2$ is methyl and $R_3$ is benzyl.

4. The compound of claim 1 wherein $R_1$ is hydrogen, $R_2$ is phenyl and $R_3$ is benzyl.

5. The compound of claim 1 wherein $R_1$ is hydrogen, $R_2$ is cyclohexyl and $R_3$ is benzyl.

6. The compound of claim 1 wherein $R_1$ is methyl, $R_2$ is 3,3-dimethylpropyl and $R_3$ is benzyl.

7. The compound of claim 1 wherein $R_1$ and $R_2$ are methyl and $R_3$ is p-chlorobenzyl.

* * * * *